July 31, 1928.
H. G. JUNGK
1,678,860
FLEXIBLE CRADLE MOUNTING
Filed Sept. 16, 1922
2 Sheets-Sheet 2
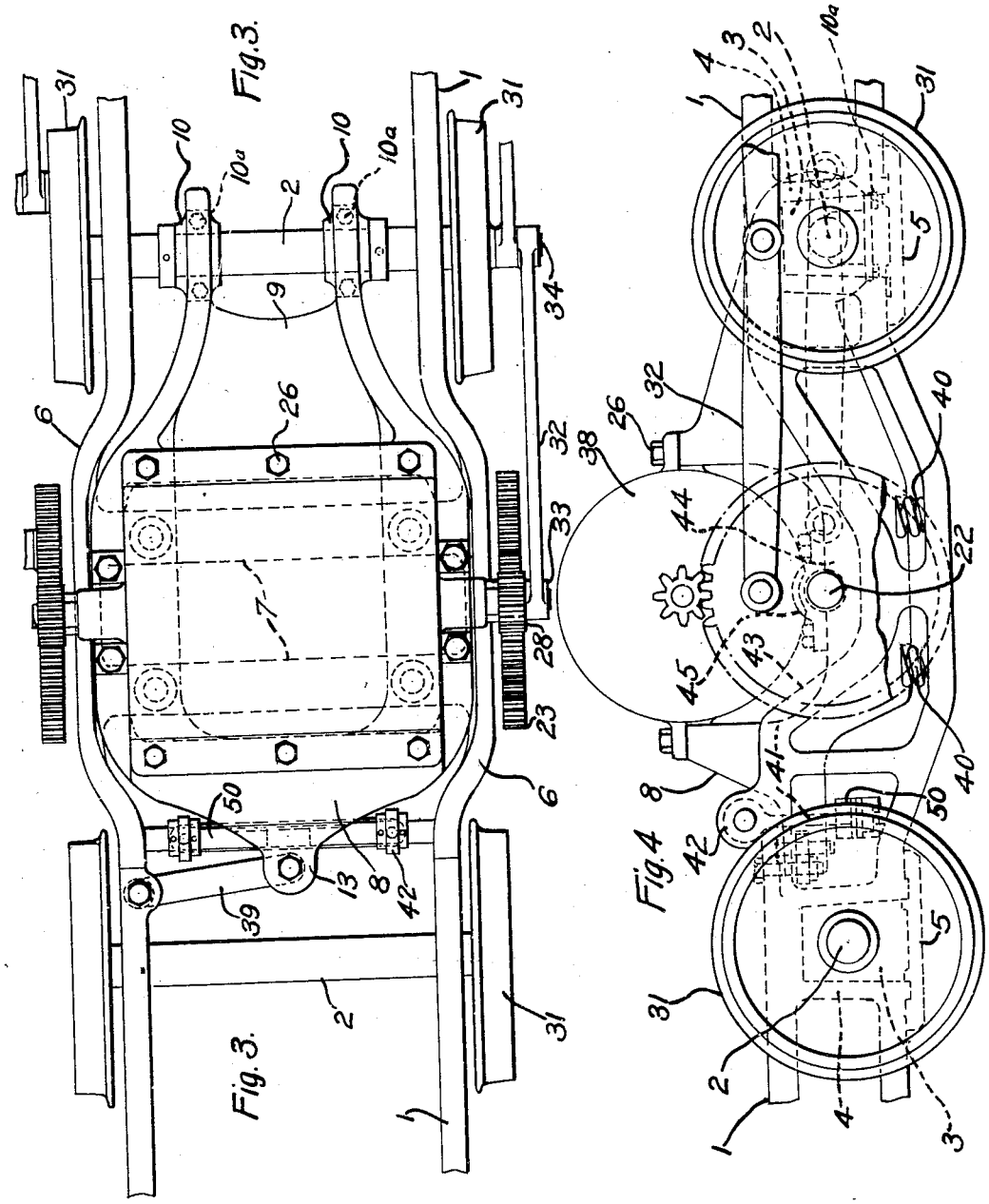
WITNESSES:
A. G. Schiefelbein
W. B. Jaspert.
INVENTOR
Herbert G. Jungk.
BY
Wesley G. Carr
ATTORNEY Patented July 31, 1928.

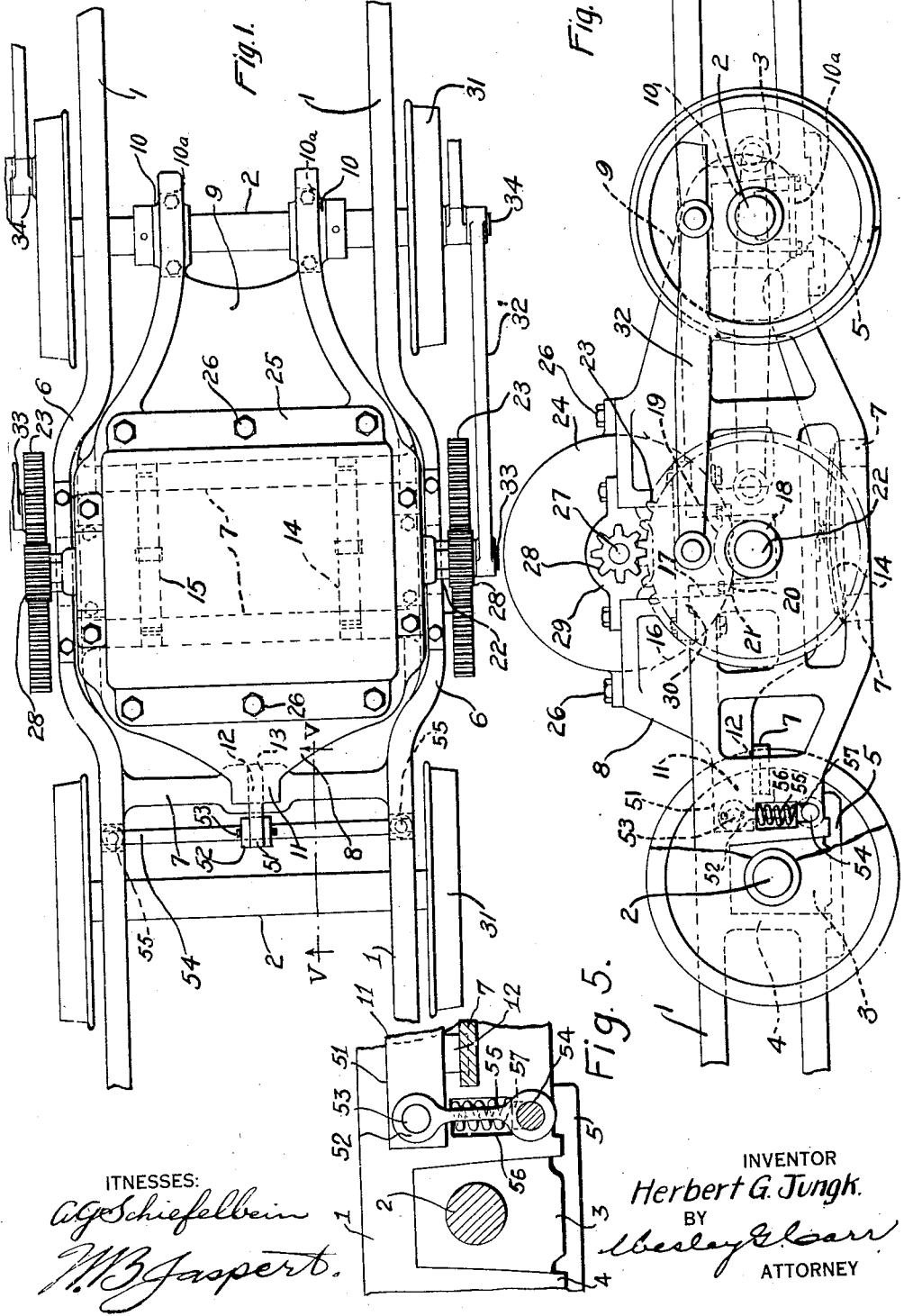

1,678,860

UNITED STATES PATENT OFFICE.

HERBERT G. JUNGK, OF PITTSBURGH, PENNSYLVANIA, ASSIGNOR TO WESTINGHOUSE ELECTRIC AND MANUFACTURING COMPANY, A CORPORATION OF PENNSYLVANIA.

FLEXIBLE CRADLE MOUNTING.

Application filed September 16, 1922. Serial No. 588,521.

My invention relates to electric-locomotive drive mechanism, more especially to a supporting structure for mounting the motor, jack-shaft, drive gears and other co-working parts thereof.

It is among the objects of this invention to provide a motor mounting that shall permit relatively large gear ratios between the drive gear wheel and the motor pinion, irrespective of the size of the driver.

It is another object of this invention to provide a motor mounting which shall be yieldably supported on the body frame.

It is a further object of the invention to provide a drive mechanism for electric locomotives which shall be of a relatively simple and mechanically durable construction, which shall be readily assembled upon the body support and which shall provide access to all its working parts.

In electric locomotives of the jack-shaft and direct-gear-drive types, the gear ratio of the main drive or jack-shaft gear wheel and motor pinion has been limited by the clearance between the jack-shaft gear wheel and the rails, even in the types where the drivers are of maximum size. This limitation affected the speed limits of the motors that could be employed and was largely responsible for the types of designs employed in mounting the drive gear comprising the motor jack-shaft and driving connections which were of the rigid-frame type.

My present invention is directed to means for mounting electric-locomotive drive mechanism which eliminates the clearance interferences encountered in the use of locomotives of previous types and permits of the use of relatively larger gear ratios without affecting the center-distance relation between the crank pins of the drive gear and the driver.

Another improvement comprises a cradle mounting of the semi-rigid or floating type which is yieldingly restrained with respect to the main locomotive-body support.

In the accompanying drawings constituting a part hereof and in which like reference characters designate like parts, Fig. 1 is a plan view of an electric-locomotive drive mechanism embodying the principles of this invention;

Fig. 2 is a side elevational view thereof;

Fig. 3 is a plan view of a modification of the construction shown in Fig. 1;

Fig. 4 is a side elevational view thereof, and

Fig. 5 is a partial sectional view of the nose of the cradle and its supporting structure, taken on the line V—V of Fig. 1.

Referring to Figs. 1 and 2, the reference numeral 1 indicates a pair of side frames constituting the main support of an electric-locomotive cab or body. The frames 1 are provided with a plurality of wheeled axles 2 journaled therein in the usual manner, as by a pair of journal boxes 3 movably secured in the frame pedestals 4 by binders 5. The frames 1 are provided with a transversely expanded frame portion 6 and are reinforced by a plurality of tie-rods 7. A motor cradle 8, constituting an integral casting having a constricted end portion 9, is adapted to be pivotally mounted on the drive axle 2 by a pair of journal bearings 10 having cross-binding caps 10a and is disposed between the expanded portions 6 of the frame 1. The cradle 8 is provided with a nose or projection 11 having a tongue 12 adapted to fit into a correspondingly shaped longitudinal guide 13, provided in the cross-tie 7. The nose 11 of the cradle 8 is further provided with a longitudinally projecting tongue 51 adapted to secure a link 52 vertically disposed and pivotally secured thereto by a pin 53. The link 52 is pivotally secured to a cross-bar 54 having enlarged end portions 57 that are adapted for vertical movement within slots 56 in the side frame members 1. Coil springs 55 are disposed within the slots 56 between the end portions 57 of the bar 54 and the upper end of the slots to yieldingly restrain vertical movement of the cradle 8.

A yielding support, comprising a pair of elliptical spring members 14 and 15, is disposed between the motor cradle 8 and the cross-ties 7 of the side frames 1 and may be located in proximity to the center of gravity of the cradle mass to provide proper load distribution and relieve the dead weight on the journal bearings 10. The cradle frame 8 is provided with a cylindrical recess 16 and a rectangular recess 17 adapted to receive a journal bearing 18 provided with a bearing cap 19 having a flange seating portion 20 adapted to fit into the recess portion 21 of the opening 17. The bearing members 18 and 19 rotatably support a jack-shaft 22 having a driving gear 23 mounted on each end thereof, and a motor stator 24 is mounted in the cylindrical recess 16 in which it is secured by a cover 25 attached to the cradle frame 8 by suitable bolts 26. The motor armature shaft 27 is provided with a pair of pinions 28 in co-operative engagement with the drive gears 23 and the armature is maintained in alinement and secured to the cradle 8 by a binder 29.

The side frames 1 are provided with vertical recesses corresponding to the recess 17 of the cradle 8 and are reinforced longitudinally by binders 30 across the frames. The jack-shaft gears 23 are linked to a pair of drivers 31 by the usual type of connecting rod 32 which is pivotally secured on the crank pins 33 and 34 of the gears and drivers, respectively. The crank pins on opposite gears and drivers have an angular displacement of 90° with respect to each other.

Referring to Figs. 3 and 4, the cradle and frame construction shown is similar to that in Figs. 1 and 2 except that the cradle 8 is adapted to receive a self-contained motor 38 which is removed from the cradle as a unit to obtain access to the jack-shaft and drive gear. The free end or nose 13 is not supported on a transverse guide, as illustrated in Fig. 1, but is provided with a link 39 pivotally secured to the side frame which is adapted to restrain lateral movement of the cradle but to permit longitudinal and slight vertical movements thereof.

The method of yieldably supporting the cradle on the side-frame cross-ties is modified by employing a plurality of helical springs 40 under its center of gravity and having an elliptical spring 50 disposed underneath the nose 13 and supported by a plurality of straps 41 suspended from brackets 42 mounted on the side frames 1. The side frames 1 are of a somewhat modified construction, having an angularly inclined depression 43 to provide clearance for the jack-shaft mounting which comprises a journal bearing 44 formed integral with the cradle 8 having a binder or bearing cap 45 secured thereacross by which the jack-shaft 22 is journaled to the cradle member. The drive gear 23 is connected to the drivers in the manner as described above.

This modified form of frame and cradle construction may be desirable for some kinds of service where accessibility to the motor and the jack-shaft is of prime importance.

The function of a cradle mounting of the just-described type is as follows: The cradle, being hinged on the supports 10 for the drive shaft 2, permits of angular movement of the cradle about the drive shaft which makes possible a vertical variation of the horizontal axis of the jack-shaft 22 relative to the horizontal axis of the drive shaft 2, thus making a wide range of clearance possible between the drive gear 23 and the rail, so that any desirable gear ratio may be employed. This vertical adjustment of the jack-shaft center does not affect the center distance of the crank pins of the gear and driver but simply alters the plane of operation without affecting the length of the connecting rod 32. This is a decided advantage and has not been permissible with drive mechanism of any type heretofore employed.

The yielding support between the free end of the cradle and the side frames relieves the dead weight on the driving boxes and permits of substantially vertical movement of the cradle relative to the main side-frame supports, thereby greatly reducing the stresses set up in the operation of the connecting rods between the drivers and the gears. The longitudinal guide 13 and the cross link 39 restrain lateral movement of the cradle which would result from the oscillating motion of the connecting rods.

From the above description of my invention it will be obvious that my form of drive mechanism is a distinct improvement over the prior art and provides an efficient and relatively simple construction.

Although I have described a specific embodiment of my invention, it will be obvious to those skilled in the art that various modifications may be made in the details of construction without departing from the principles herein set forth. For instance, the general design of side frames, cradle frame and general mountings may be altered to suit specific operating conditions and the method and type of resilient supports provided for yieldingly mounting the cradle may be modified as by varying the type and location of springs with respect to the hinge support of the cradle.

I claim as my invention:

1. An electric-locomotive drive mechanism comprising a motor cradle disposed between the side frames of the cab support and pivotally supported on one of the driving axles thereof and having its free end yieldingly supported, a jack-shaft rotatably mounted in said cradle and having a drive gear secured at both ends thereof, and a motor mounted in said cradle having pinions secured to the ends of its armature shaft in co-operative relation to said drive gears.

2. An electric-locomotive drive mechanism comprising a motor cradle disposed between the side frames of the cab support and pivotally supported on one of the driving axles thereof and having its free end yieldingly supported, a jack-shaft rotatably mounted in said cradle and having a drive gear secured at both ends thereof, a motor mounted in said cradle and having pinions secured to the ends of its armature shaft in co-operative relation to said drive gears, said drive gears being workably connected to a pair of drive wheels.

3. An electric-locomotive drive mechanism comprising a motor cradle disposed between the side frames of the cab support and pivotally supported on one of the drive axles and having its free end yieldingly supported, a cross-tie secured to said frame and provided with a longitudinal guide in co-operative alinement with a tongue on the free end of said cradle, a spacer link pivotally mounted on said cradle and one of the side frames, a motor mounted in said cradle and having pinions secured to the ends of its armature shaft in co-operative relation to said drive gears, said gears being workably connected to a pair of drive wheels.

4. An electric-locomotive drive mechanism comprising a motor cradle disposed between the side frames of the cab support and pivotally supported on one of the driving axles thereof and having its free end yieldingly supported, a jack-shaft rotatably mounted in said cradle and having a drive gear secured at both ends thereof, a motor mounted in said cradle and having pinions secured to the ends of its armature shaft in co-operative relation to said drive gears and a pair of connecting rods secured at right angles to each other on the outside of said drive gears to provide connecting links for a pair of drive wheels.

5. An electric-locomotive drive mechanism comprising a motor cradle disposed between the side frames of the cab support and pivotally supported on one of the driving axles thereof and having its free end yieldingly supported, a jack-shaft rotatably mounted in said cradle and having a drive gear secured at both ends thereof, a motor mounted in said cradle and having pinions secured to the ends of its armature shaft in co-operative relation to said drive gears and a pair of connecting rods secured at right angles to each other on the outside of said drive gears to provide connecting links for a pair of drive wheels, said cradle, jack-shaft, drive gears and motor comprising a unitary structure.

6. In combination with an electric-locomotive body support, a motor-cradle mounting comprising a cradle support having a jack-shaft, drive gears and a driving motor mounted thereon, means for vertically adjusting the horizontal axis of the jack-shaft with respect to the driving axle and means for yieldingly supporting said cradle.

7. In combination with an electric-locomotive body support, a motor-cradle mounting comprising a cradle support having a jack-shaft, drive gears and a driving motor mounted thereon, means for providing angular adjustment of the jack-shaft with respect to the driving axle and means for yieldingly supporting said cradle.

8. In combination with an electric-locomotive body support, a motor-cradle mounting comprising a cradle support having a jack-shaft, drive gears and a driving motor mounted thereon, means for providing angular adjustment of the jack-shaft with respect to the driving axle and means for yieldingly supporting said cradle, said adjusting means comprising a hinged support on one end of said cradle about which the cradle is angularly movable and said yielding support comprising a plurality of leaf springs interposed between said cradle and the body support.

9. In combination with an electric-locomotive body support, a motor-cradle mounting comprising a cradle support having a jack-shaft, drive gears and a driving motor mounted thereon, means for vertically adjusting the horizontal axis of the jack-shaft with respect to the driving axle, and means for maintaining the center distance between the connecting-rod crank pins of said drive gears and the drivers.

10. In combination with an electric-locomotive body support, a motor-cradle mounting comprising a cradle support having a jack-shaft, drive gears and a driving motor mounted thereon, means for providing angular adjustment of the jack-shaft with respect to the driving axle and means for yieldingly supporting said cradle, said adjusting means comprising a hinged support on one end of said cradle about which the cradle is angularly movable and said yielding support comprising a plurality of leaf springs interposed between said cradle and the body support, and means for restraining lateral and vertical movement between said cradle and said body support.

In testimony whereof, I have hereunto subscribed my name this 12th day of September, 1922.

HERBERT G. JUNGK.